(12) United States Patent
Reynolds

(10) Patent No.: US 9,515,518 B2
(45) Date of Patent: Dec. 6, 2016

(54) IDEAL DIODE

(71) Applicant: Robert Reynolds, Newbury Park, CA (US)

(72) Inventor: Robert Reynolds, Newbury Park, CA (US)

(*) Notice: Subject to any disclaimer, the term of this patent is extended or adjusted under 35 U.S.C. 154(b) by 0 days.

(21) Appl. No.: 14/484,258

(22) Filed: Sep. 12, 2014

(65) Prior Publication Data

US 2016/0079805 A1    Mar. 17, 2016

(51) Int. Cl.
*H02J 1/00*    (2006.01)
*H02J 7/35*    (2006.01)

(52) U.S. Cl.
CPC ... *H02J 7/35* (2013.01); *H02J 1/00* (2013.01)

(58) Field of Classification Search
CPC .............. H02J 1/10; H02J 1/00; H02J 9/061; H02J 7/0034; H02J 7/35
USPC ............................................ 307/80; 320/165
See application file for complete search history.

(56) References Cited

U.S. PATENT DOCUMENTS

| | | | | |
|---|---|---|---|---|
| 5,221,891 A | * | 6/1993 | Janda | H02J 7/35 136/293 |
| 6,046,570 A | * | 4/2000 | Gabbai | H02J 7/35 320/101 |
| 6,713,989 B1 | * | 3/2004 | Reynolds | 320/165 |
| 7,501,789 B2 | * | 3/2009 | O'Donoghue | H02J 7/35 320/101 |
| 2010/0002470 A1 | * | 1/2010 | Kiamilev | G05F 1/67 363/16 |
| 2014/0293491 A1 | * | 10/2014 | Robbins | H02H 7/00 361/54 |

* cited by examiner

*Primary Examiner* — Jared Fureman
*Assistant Examiner* — Alfonso Perez Borroto
(74) *Attorney, Agent, or Firm* — Philip T. Virga

(57) ABSTRACT

An active switch for electrically connecting and disconnecting a power source such as an energy harvester to a charge storage device is disclosed. The active switch allows a minimal amount of reverse back current flow from the charge storage device to the power source having a high off-resistance.

17 Claims, 6 Drawing Sheets

IDEAL DIODE

BACKGROUND

Conventional solar battery charging systems employ a "back flow" or reverse current diode to prevent battery current from flowing back through a solar array in the absence of solar energy. Typically, a Schottky diode is used for this reverse current protection due to a low forward voltage drop inherent for Schottky diode operation. The forward voltage drop has a direct impact on charge efficiency such that the less power that is dissipated across the diode, the more charge power is delivered to the battery. The charge efficiency has been acceptable when dealing with macro solar charging systems since the battery charge voltages have been typically "high" in ratio to the Schottky diode forward voltage drop. However, this is not desirable in micro solar charging systems where the charge voltages are not high in ratio to the Schottky diode forward voltage drop. Therefore it would be desirable to provide a circuit that prevents battery back flow current having less forward voltage drop than a Schottky diode.

FIG. 1 illustrates a prior art circuit diagram disclosed in U.S. Pat. No. 6,713,989, entitled "Solarswitch" issued to the inventor of this application and incorporated herein in its entirety. Referring now to FIG. 1, an active backflow switch $Q_1$ which serves to prevent current from the charged battery from flowing back into the solar array $S_1$ 34 when no solar illumination is present thus protecting the battery from discharge. The circuit is composed of a differential amplifier $IC_1$ 44 BB OPA349 and a N-channel enhancement mode MOSFET switch $Q_1$ Siliconix Si2302DS for example. The battery $B_1$ 38 in this example is a 4.2 volt, 2500 mah lithium polymer and the solar array $S_1$ 34 is composed of two triple junction GaAs solar cells providing 250 ma of charge current at approximately 4.5 volts. Also a battery charge voltage regulator is normally present but is not shown for simplicity.

Since the differential amplifier $IC_1$ is supplied operational current from the battery $B_1$ 38, positive and negative terminals, and is continually operating even when there is no solar luminance, differential amplifier $IC_1$ is selected to have ultralow quiescent current $\approx$10 microamp such that there would be insignificant current draw from the battery $B_1$ 38. This has served to work appropriately for large capacity batteries 500 mah and above. However, battery types commonly used in various ultralow power energy harvesting applications may have capacity ratings of 1 mah or lower and will rapidly discharge while continuously operating a device such as $IC_1$ with a quiescent current draw near 10 micro amps. Therefore, a backflow switch with zero quiescent current in the non-operational state (off state when no energy is being harvested) is required to prevent discharge of low capacity batteries of 500 mah or less in energy harvesting applications and the like.

SUMMARY OF THE INVENTION

An ideal diode for use in energy harvesting systems combines a field effect transistor and an operational amplifier together wherein the field effect transistor is operated by the operational amplifier having a pull down resistor for electrically connecting and disconnecting a power source to a device whereby when disconnecting the power source from the device a minimal amount of reverse back current flow from the device to the power source is allowed. The operational amplifier is powered by the power source wherein the pull down resistor ensures the ideal diode shuts off when no power source is available.

DESCRIPTION OF THE PREFERRED EMBODIMENT

Figure 1:
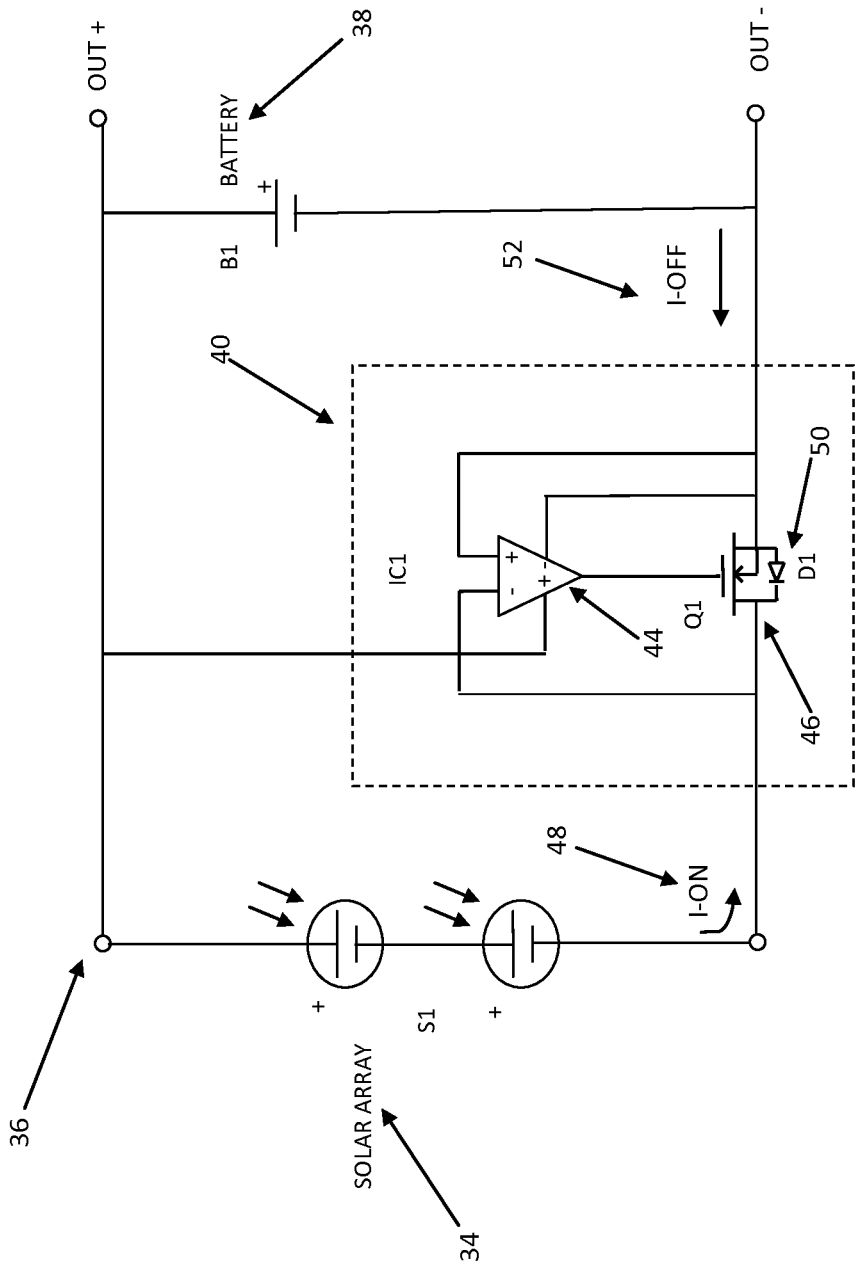
FIG. 1 shows a prior art circuit diagram incorporating an active switch circuit in a micro solar charging system.

Referring to FIG. 1 there is shown a prior art circuit diagram 36 of an intermittent current limited power source such as a solar array $S_1$ 34 connected to a device for storing charge such as a battery $B_1$ 38 through an active switch circuit 40. The active switch circuit 40 substantially reduces the power that is lost by conventional reverse current diodes normally associated with solar charging devices. Referring once again to FIG. 1, the active switch circuit 40 consists of a reverse current detector $IC_1$ 44 and a low loss N-channel enhancement mode MOSFET switch $Q_1$ 46 having an internal diode D1 50. In operation, incident solar energy generated by solar array $S_1$ 34 causes a counter clockwise current flow to occur as shown by "I-on" 48 in FIG. 1. The solar array 34 electromotive force (EMF) forward biases D1 50 and current begins to flow. The reverse current detector $IC_1$ 44, which in this embodiment is shown as a differential amplifier detects the positive difference voltage across D1 50 at the non inverting input which causes $Q_1$ 46 to turn on. $Q_1$ 46 acts a low loss switch with a very low source to drain resistance overcoming the power loss associated with conventional diodes. The absence of solar energy incident upon the solar array 34 causes the current flow described above to stop and current from the battery attempts to flow in the reverse direction as indicated by "I-OFF" 52 in FIG. 1. The reverse current detector $IC_1$ 44 detects a negative differential voltage at the non inverting input and causes $Q_1$ 46 to turn off.

More specifically, D1 50 and Q1 46 provide a voltage drop such that $IC_1$ 44 is able to detect current flow without the addition of a series resistor that is normally present in current sensing applications. Thus the directional current sense detector is able to determine current flow without the usual power losses associated with series resistors. In this manner, it is a virtually a "loss less" current detection device since it adds no significant power losses to the system. It should be understood that D1 50 additionally would not conduct current in the I-Off direction 52.

Figure 2:
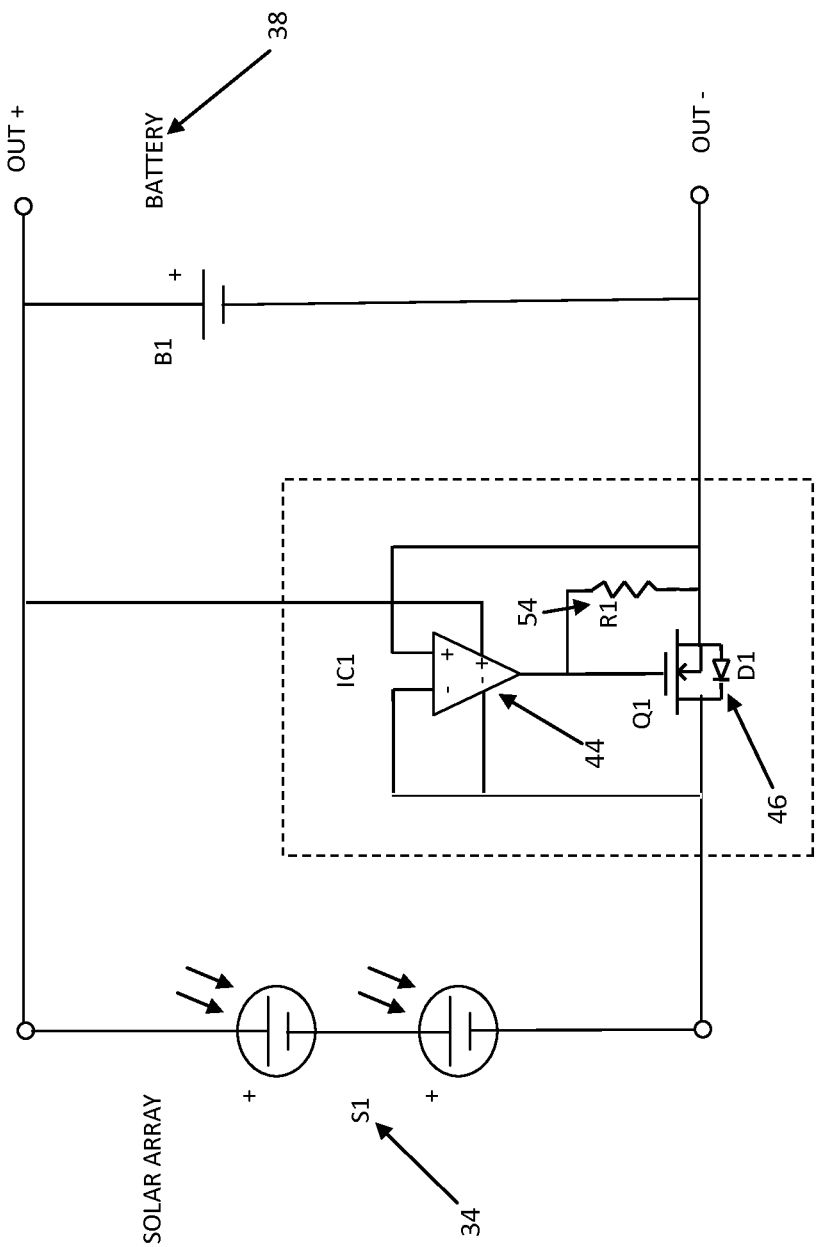
FIG. 2 shows a circuit diagram of one embodiment of the present invention incorporating an active switch circuit in an energy harvesting system.

Referring to FIG. 2 there is shown a preferred embodiment whereby differential amplifier $IC_1$ 44 now derives operational current from the solar array $S_1$ 34 by connecting differential amplifier $IC_1$ 44 negative return power input terminal directly to the negative terminal of the solar array $S_1$ 34. In this manner, differential amplifier $IC_1$ 44 is only operational when solar array $S_1$ 34 is illuminated to the degree that properly biases differential amplifier $IC_1$ 44 to turn on N-channel enhancement mode MOSFET switch $Q_1$ Siliconix Si2302DS 46 which then delivers solar array $S_1$ 34 current to effectively charge battery $B_1$ 38. When there is no solar illumination of solar array $S_1$ 34, there is no current flow in differential amplifier $IC_1$ 44 neither from the solar array $S_1$ 34 nor battery $B_1$ 38. The addition of pull down resistor $R_1$ 54 ensures that MOSFET switch $Q_1$ 46 will be fully turned off when no solar illumination is present.

Figure 3:
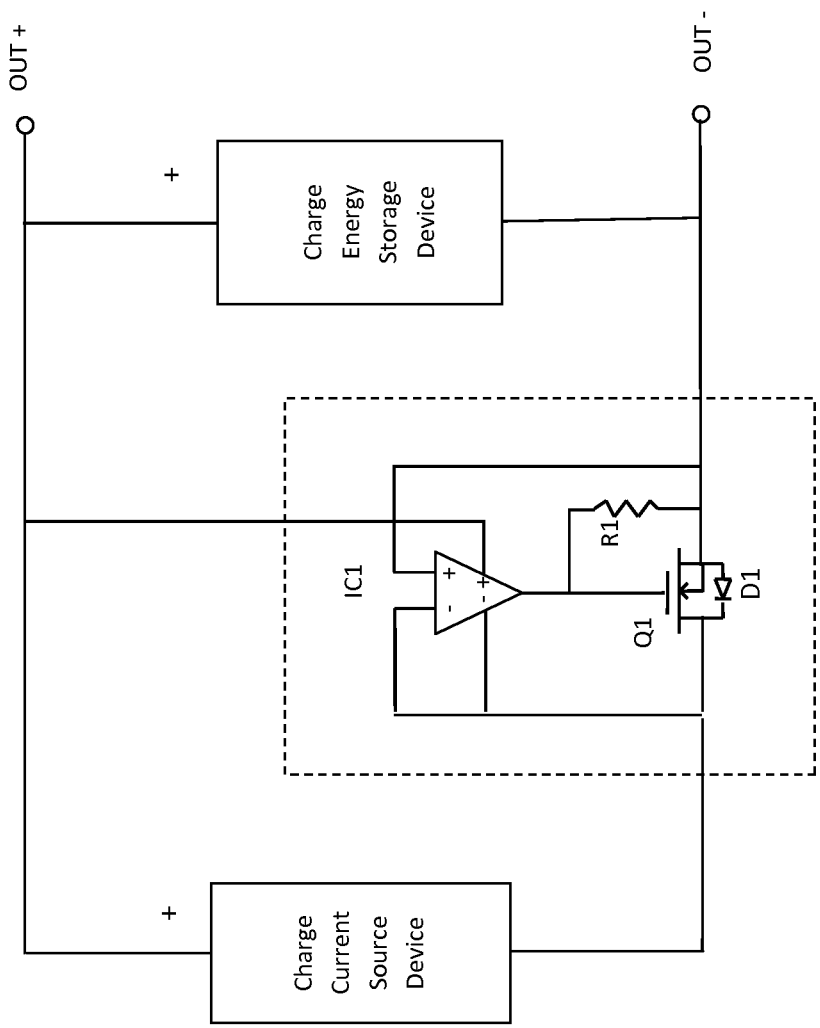
FIG. 3 shows a simplified generic circuit diagram implementing the active switch circuit of FIG. 2.

The circuit and operation of FIG. 2 demonstrates a solar charging battery as an example use of the preferred embodiment. However, those skilled in the art may apply the preferred embodiment to any number of like energy harvesting applications where ever a low loss, zero quiescent current backflow switch is required. FIG. 3 conceptually represents such a generic application.

Figure 4:
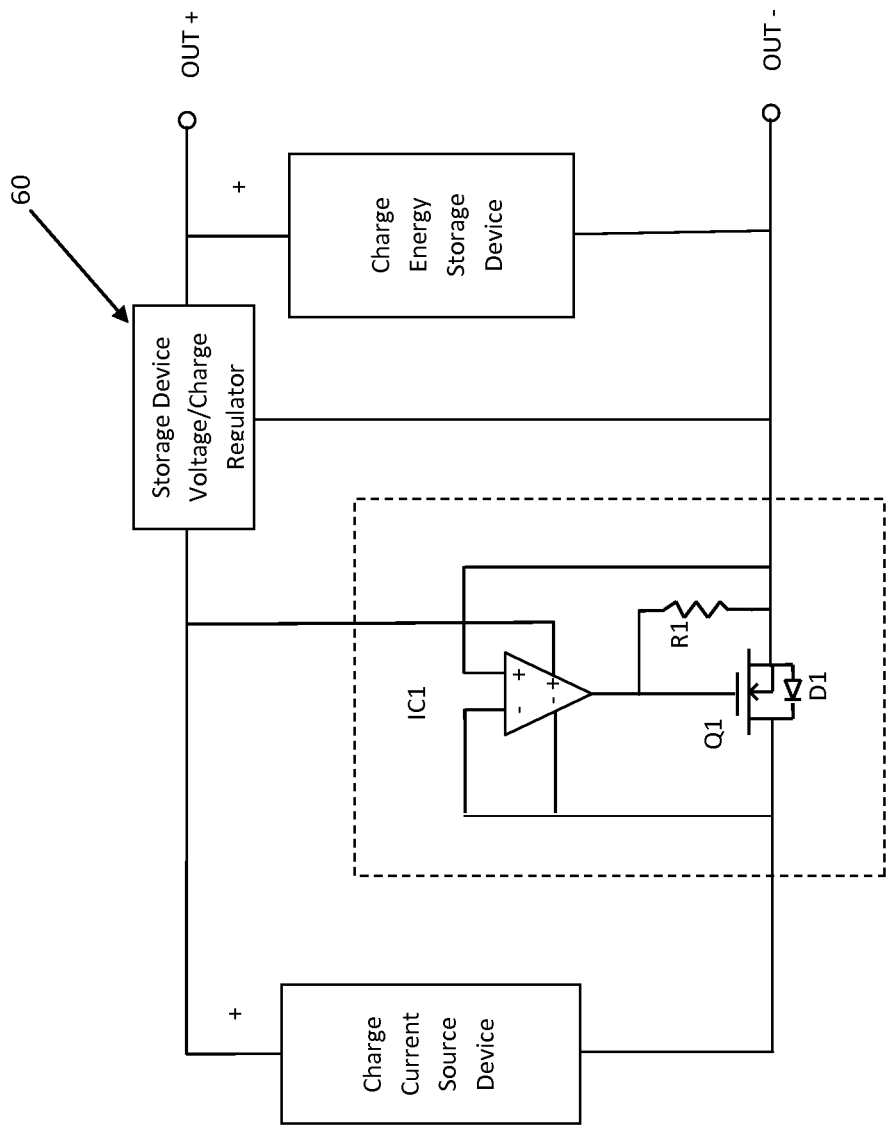
FIG. 4 shows a simplified generic circuit diagram incorporating a conventional current/voltage regulator to the energy harvesting system powered by the battery $B_1$ 38 shown in FIG. 2.

Turning now to FIG. 4 conceptually represents the addition of a conventional Current/Voltage Charge Regulator 60 connected between the current/charge source, the backflow preventer, and the Charge/Energy Storage Device. In the conventional configuration, the Current/Voltage Charge Regulator 60 may consist of components that require a small amount of current drain such as a voltage divider used to compare or reference the output voltage to a known voltage reference for proper voltage regulation of the Current/Voltage Charge Regulator 60. While this current draw may be acceptable for charge storage devices of 500 mah or more, there may be excessive current draw for energy harvesting charge storage devices less than 500 mah capacity.

Figure 5:
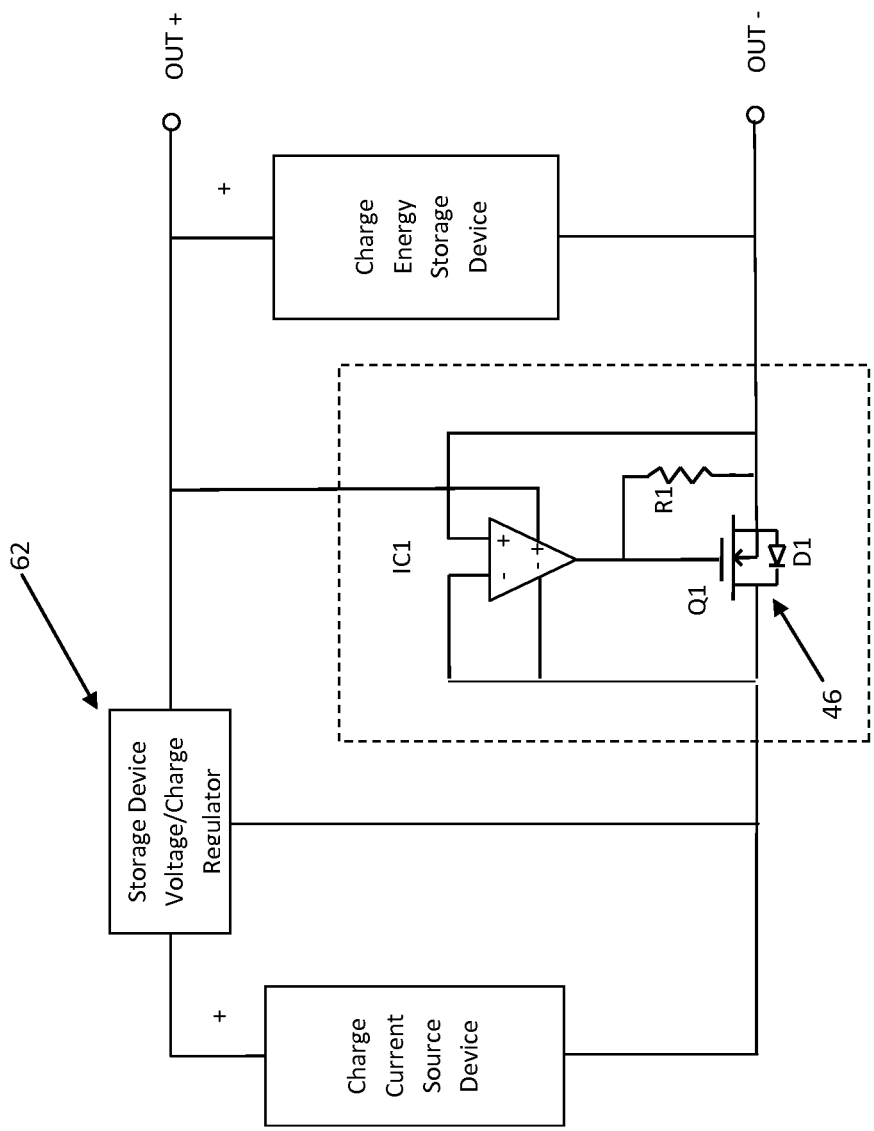
FIG. 5 shows a simplified generic circuit diagram incorporating an active current/voltage regulator to the energy harvesting system powered by the solar array $S_1$ 34 shown in FIG. 2.
Figure 6:
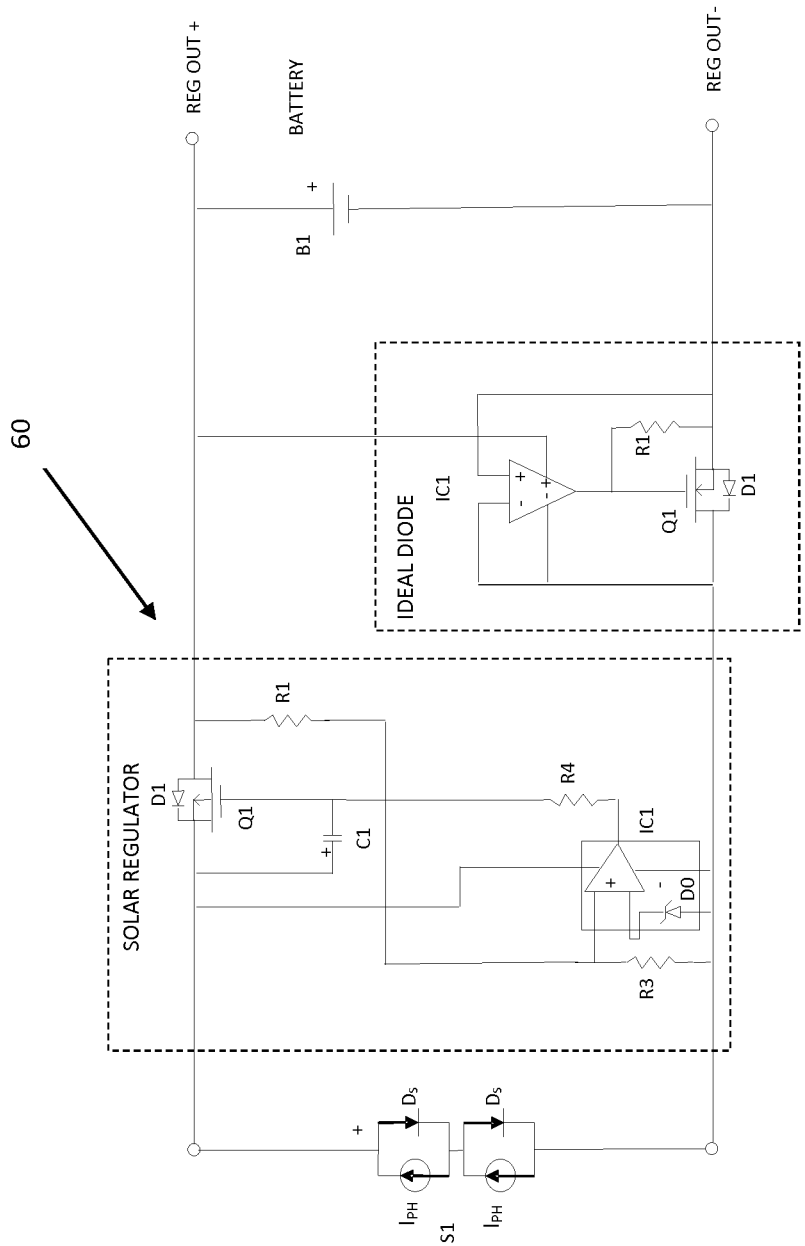
FIG. 6 shows another simplified circuit diagram incorporating an active current/voltage regulator powered by the solar array $S_1$ 34 to the energy harvesting system shown in FIG. 2.

The circuit configuration of FIG. 5 gives another preferred embodiment in accordance with the present invention utilizing an active Current/Voltage Charge Regulator 62 now being connected between the Charge Current Source Device and the Idea Diode Zero Quiescent Back Flow Switch. In this configuration there will be no current drain through the active Current/Voltage Charge Regulator 62 when there is no solar illumination present since the Idea Diode Zero Quiescent Back Flow Switch now effectively provides an open circuit to the Charge/Energy Storage Device. The voltage drop across a conventional backflow diode would prohibit the use of a voltage regulator in this configuration due to imprecise voltage feedback to Current/Voltage Charge Regulator.

However, since the Diode Zero Quiescent Back Flow Switch exhibits insignificant voltage drop in typical energy harvesting low current applications, the Current/Voltage Charge Regulator can be placed in this configuration with insignificant regulation error.

Therefore, the only current drain of Charge/Energy Storage Device in FIG. 5 would be limited to the leakage current back through the MOSFET switch $Q_1$ 46 of the Diode Zero Quiescent Back Flow Switch which is compatible with low power energy harvesting applications.

It should further be noted that numerous changes in details of construction, combination, and arrangement of elements may be resorted to without departing from the true spirit and scope of the invention as hereinafter claimed.

What is claimed is:

1. An energy harvesting system, comprising: an intermittent current limited power source; a device for storing charge; and an active switch comprising a positive power input, a negative power input and an output;

said active switch powered by said current limited power source, having said active switch positive and negative power input connected directly to said current limited power source and said active switch output connected in series with a charge terminal of said device for storing charge for electrically connecting and disconnecting the power source to the device wherein when disconnecting the power source from the storage device the active switch allows a minimal amount of reverse back current flow from the storage device to the power source and wherein a pull down resistor ensures said active switch shuts off when no power source is available.

2. The energy harvesting system according to claim 1, wherein said active switch further comprises: a field effect transistor operated by a current directional detector.

3. The energy harvesting system according to claim 2, wherein said current directional detector further comprises: a differential amplifier.

4. The energy harvesting system according to claim 2, wherein said current directional detector further comprises: an operational amplifier.

5. The energy harvesting system according to claim 1, further comprises: an active switch regulation/regulator circuit electrically connected between said power source and said active backflow switch.

6. The energy harvesting system according to claim 1, wherein said device for storing charge is less than 500 mah.

7. An energy harvesting system, comprising:
an intermittent current limited power source; a device for storing charge; and
a field effect transistor comprising a gate, a drain and a source;
operated by a current directional detector comprising a positive input, a negative input and an output, having the source of the field effect transistor electrically connected to the positive input, the drain electrically connected to the negative input and the gate electrically connected to the output of said current directional detector;
said current directional detector powered by said current limited power source,
having said current directional detector positive and negative power input connected directly to said current limited power source wherein said field effect transistor and said current directional detector control electrically connects and disconnects the power source to the device wherein when disconnecting the power source from the device the combination of the field effect transistor and control current directional detector with a pull down resistor directly connected between said field effect transistor gate and source allows a minimal amount of reverse back current flow from the device to the power source.

8. The energy harvesting system according to claim 7, wherein said current directional detector further comprises: a differential amplifier.

9. The energy harvesting system according to claim 7, wherein said current directional detector further comprises: an operational amplifier.

10. The energy harvesting system according to claim 7, further comprises: an active switch regulation/regulator circuit electrically connected between said power source and said device.

11. The energy harvesting system according to claim 7, wherein said device for storing charge is less than 500 mah.

12. An active switch for use in energy harvesting systems comprising:
- a field effect transistor, said field effect transistor comprising a gate, a drain and a source, said field effect transistor operated by an operational amplifier comprising a positive input, a negative input, and an output, having a pull down resistor directly connected between said field effect transistor gate and source to ensure electrically connecting and disconnecting a power source to a device, having said operational amplifier positive and negative power input connected directly to said current limited power source, whereby when disconnecting the power source from the device a minimal amount of reverse back current flow from the device to the power source is allowed.

13. The active switch according to claim 12, wherein said current directional detector comprises: a differential amplifier.

14. The active switch according to claim 12, wherein said current directional detector further comprises: an operational amplifier.

15. The active switch according to claim 12, further comprises: an active switch regulation/regulator circuit.

16. The active switch according to claim 12, wherein said power source is photovoltaic.

17. The active switch according to claim 12, wherein said device is a battery.

\* \* \* \* \*